L. ARNTZ.
SPECTACLE LENS MOUNT.
APPLICATION FILED SEPT. 11, 1916.
1,265,417.
Patented May 7, 1918.
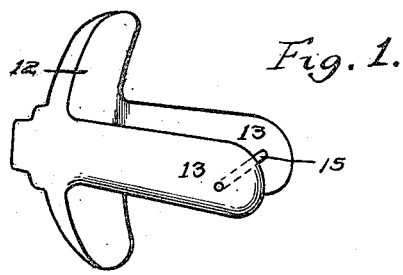
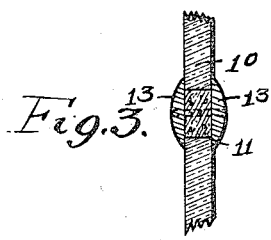
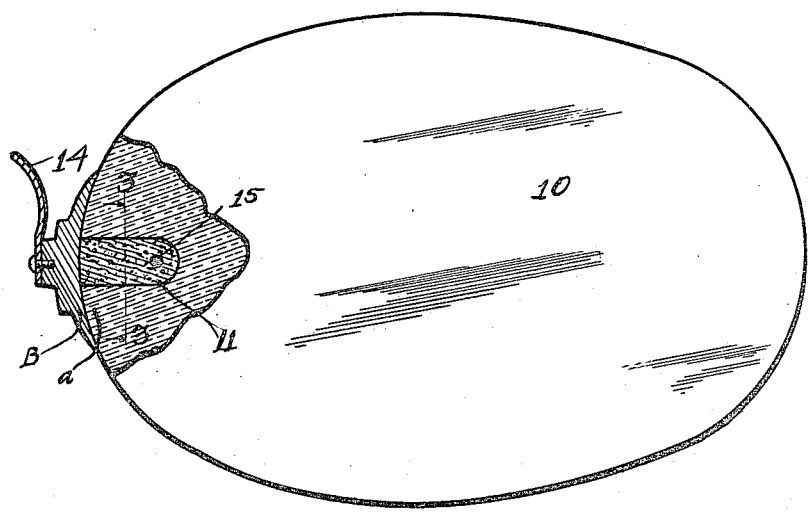
Witness
Will Freeman
Inventor
Lew Arntz
by Onwig & Bair Attys

UNITED STATES PATENT OFFICE.

LEW ARNTZ, OF DES MOINES, IOWA.

SPECTACLE-LENS MOUNT.

1,265,417.  Specification of Letters Patent.  Patented May 7, 1918.

Application filed September 11, 1916. Serial No. 119,448.

*To all whom it may concern:*

Be it known that I, LEW ARNTZ, a citizen of the United States, and resident of Des Moines, in the county of Polk and State of Iowa, have invented a certain new and useful Spectacle-Lens Mount, of which the following is a specification.

The object of my invention is to provide means of simple, durable and inexpensive construction for connecting a spectacle lens to a mount in such a manner that the lens will be firmly and immovably held in position relative to the mount, and also in such a manner that strains applied to the outer end of the lens will not tend to break the lens at the point where it is connected with the mount.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view of a spectacle lens mount of the kind employed in my improvement.

Fig. 2 shows a side view of a lens and a part of the lens mount connected therewith and embodying my invention, part of the lens and the lens mount and the cement material therein, being illustrated in section, and Fig. 3 shows a sectional view on the line 3—3 of Fig. 2.

Referring to the accompanying drawings, I have used the reference numeral 10 to indicate a lens of the ordinary construction, provided at one end with a comparatively wide slot at 11. The lens mounting comprises a body portion 12 shaped to fit the edge of the lens, and two side extensions 13 designed to overlap and engage the sides of the lens, and 14 indicates a part of the nose piece to connect two lens mountings with each other.

A relatively small pin or rivet 15 is extended through the outer ends of the side extensions 13 of the lens mounting, for purposes hereinafter made clear. These side extensions of the lens mounting are somewhat larger than the slot 11, so that they both overlap the edges of said slot.

In connecting a lens with my improved mounting, I first completely fill the slot 11 with a cement material having the characteristic of adhering firmly to the edges of the lens and to the pin or rivet and also to the adjacent parts of the mount, and having also the further characteristic of being plastic when first inserted and then in a short time hardening to a considerable extent but being greatly tougher than glass even when hardened. Cements of this kind are well known to those skilled in the art of lens mounting, and are now in common use, hence it is not deemed necessary to here describe the ingredients of said cement material.

The lens mounting is constructed with the pin or rivet in place, and then the lens mounting is placed in position relative to the lens, during which movement the pin or rivet is forced through the slot 11 from the outer edge thereof and through the cement material which is in a plastic condition to permit such movement. The pin is so small and is made of such material as to permit it to bend during such movement. This brings the side extensions firmly in contact with the lens and the cement material, and after the cement material hardens the pin or rivet cannot straighten out.

In this connection another advantage of my invention is that the lens mounting may be readily and quickly adjusted to accurately fit lenses of different thicknesses by simply using pincers to force the side extensions toward each other until they engage the lens.

After the lens has been thus secured to the mount and the cement has set and hardened, it will be obvious that when a heavy or unusual strain is applied for instance to the right end of the lens appearing in Fig. 2, in a downward direction, the pin 15 will tend to serve as a pivot and cause the edge of the lens at "*a*" to crowd or press against the part of the mounting at "*b*", thus producing on the lens a crushing strain directed straight inwardly toward the center thereof. It is well known that glass of which lenses are made will stand a very great amount of pressure or strain in this direction without breaking. However, all of the pressure thus applied is not directed in the manner just described, because the cement material is, as before stated, tougher than glass, and under such strains it will yield slightly before breaking, so that there will also be a tendency for the pin (under the circumstances before mentioned) to move downwardly to a slight extent in the cement. Of course this tendency to movement is very slight and there is sufficient compressible or yielding quality in the cement so that if such movement of the pin therein should take place, it would spring back to its original position when the strain was removed.

Attention is here directed to the fact that a strain or pressure upon the lens of the kind before described, will have no tendency whatever to wedge or spring apart the sides of the lens adjacent to the slot, and it is well known that glass will break very easily and readily under such strain as, for instance, is applied when a slot is formed in the glass and there is a pressure tending to wedge apart the glass at the sides of the slot. In my improvement I have provided a lens mounting in which no strains that are likely to be applied to either the lens or the mount, will tend to have this wedging effect upon the lens at the slot, and I have demonstrated that by means of my improvement the lenses may be subjected to very unusual and violent strains without breaking them at the point of their connection with the mount.

I claim as my invention:

1. An improved lens mounting comprising a lens having an elongated slot adjacent to one end and extending inwardly therefrom, a mount shaped to fit against the edge of the lens adjacent to the slot and having side extensions adapted to overlap the lens surrounding said slot and to cover said slot, cement material in said slot and between the extensions on the mount, and a flexible pin extended through said extensions and the mounting, said pin being spaced apart from the glass of the lens whereby the movement of the extensions of the mount over the slot and of the pin through said cement will bend the pin to thereby draw said extensions tightly against the surface of the glass.

2. In an improved lens mounting, a lens having an elongated slot extended inwardly from one end thereof, a lens mount comprising a body portion adapted to fit against the edges of the lens adjacent to the end of said slot, ears extended from either side of said body portion and adapted to abut against the edge of said lens, and a pair of extensions adapted to cover said slot and the adjacent portion of the lens, and a flexible pin extended through said extensions and the slot in position spaced from the glass of the lens whereby pushing the mount and pin to position adjacent to the slot when the latter is filled with plastic cement will bend the pin to thereby draw the extensions together to cause the latter to fit closely against the glass of the lens.

Des Moines, Iowa, August 19, 1916.

LEW ARNTZ.

Copies of this patent may be obtained for five cents each, by addressing the "Commissioner of Patents, Washington, D. C."